May 17, 1960  J. C. DUPRE  2,936,526
DIRECT READING HEIGHT GAUGE
Filed May 27, 1959  3 Sheets-Sheet 2
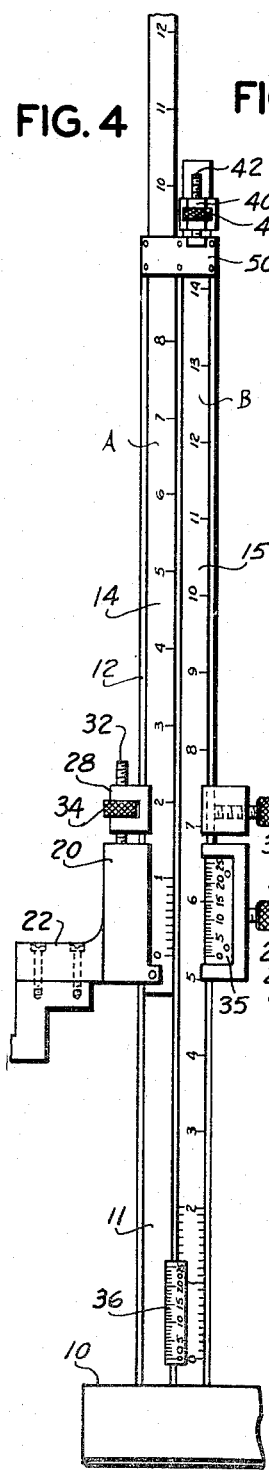
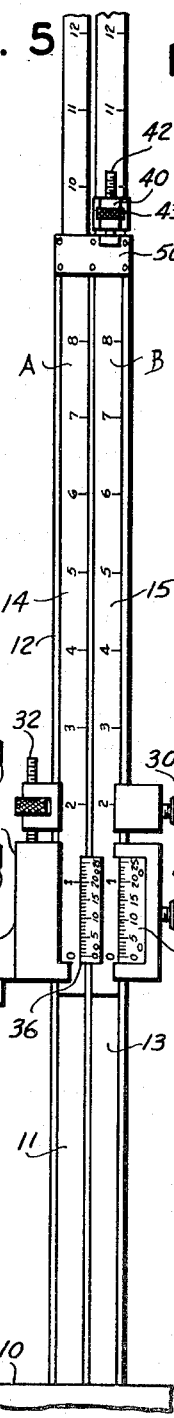
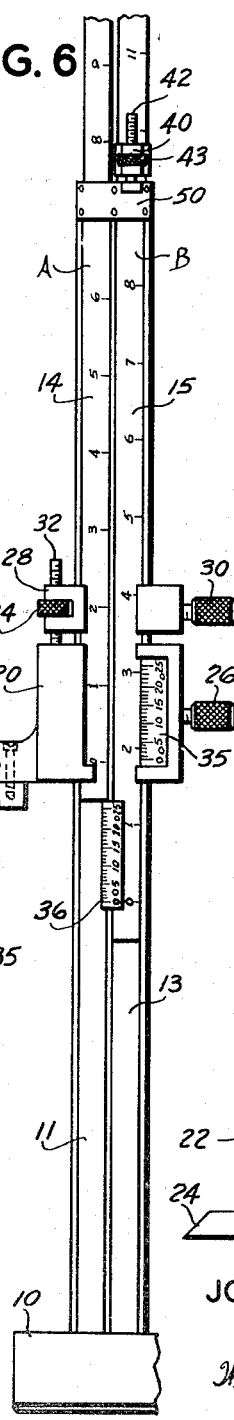
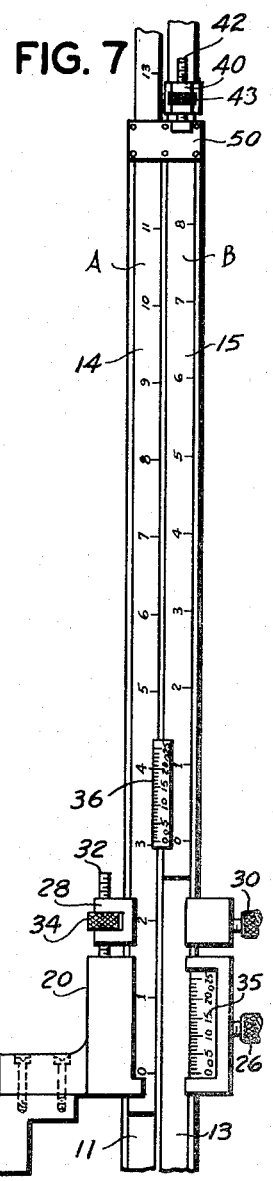
INVENTOR
JOSEPH C. DUPRE
William Frederick Werner
ATTORNEY May 17, 1960  J. C. DUPRE  2,936,526
DIRECT READING HEIGHT GAUGE
Filed May 27, 1959  3 Sheets-Sheet 3

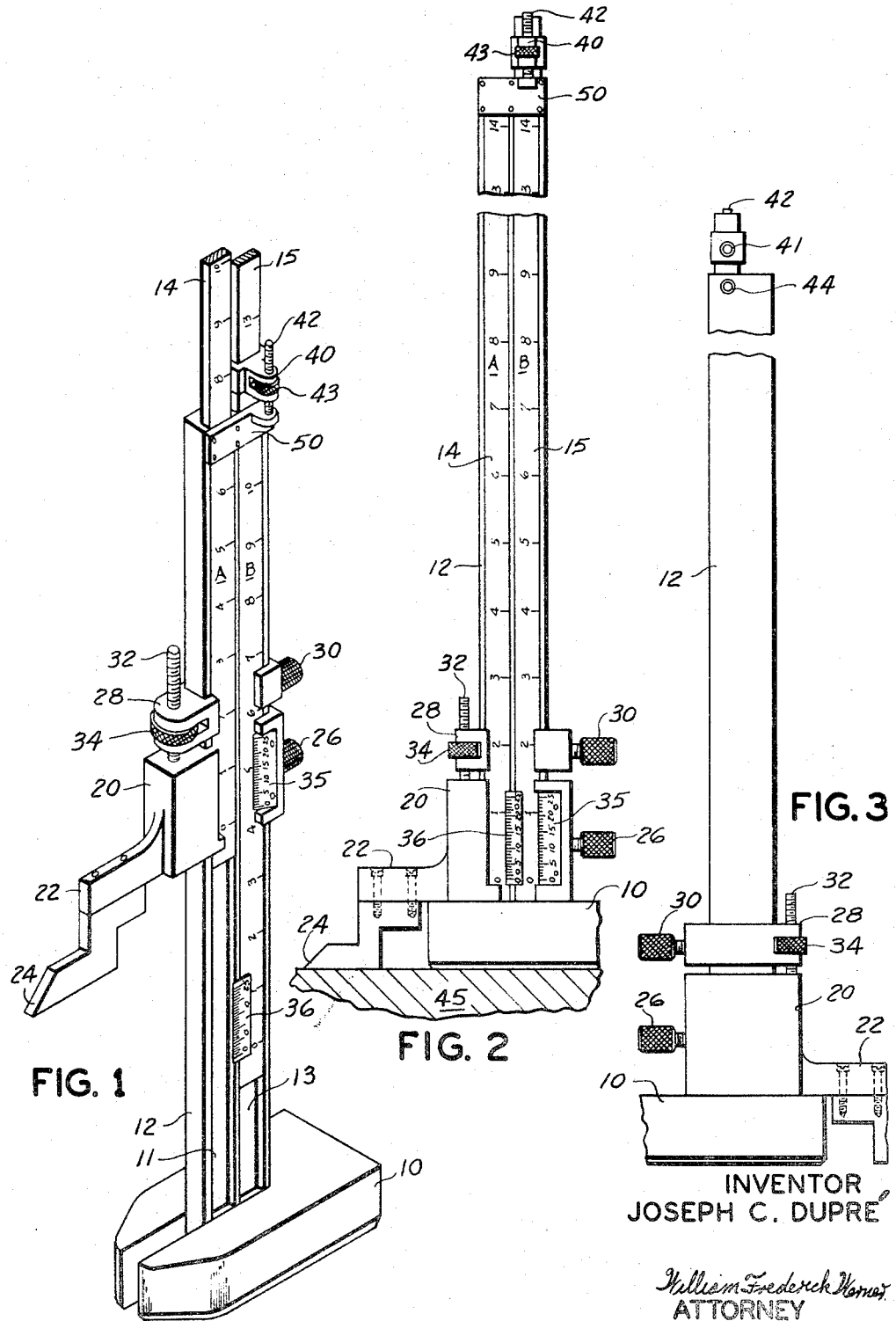

INVENTOR
JOSEPH C. DUPRE
William Frederick Werner
ATTORNEY

2,936,526
DIRECT READING HEIGHT GAUGE

Joseph C. Dupre, North Providence, R.I.

Application May 27, 1959, Serial No. 816,097

4 Claims. (Cl. 33—170)

This invention relates to height gauges and more particularly to height gauges in which distances above or below a selected and variable reference level can be read directly.

It is an object of the present invention to provide an improved height gauge, which may be readily adjusted to bring the zero point of a selected scale to a desired reference level and which will provide direct reading measurements of distances above and below that reference level.

It is another object of the present invention to provide a height gauge in which both upward and downward distances from the reference level may be read directly or measured without resetting the gauge.

It is still another object of the present invention to provide a height gauge which eliminates secondary calculations and the resultant chances of error in gauging a distance from a given reference point by providing a direct reading on the gauge of the distance desired from the reference point.

Other objects of the present invention will become apparent in part and be pointed out in part in the following specification and claims.

In the past height gauges consisted of a single scale provided with a single scriber arm or a single scale having two scriber arms. Or, three interrelated scales co-acting with a single scriber arm.

The present invention overcomes all the disabilities of and the necessity for arithmetical calculations to locate a point above or below a selected reference point by providing for direct scale reading above or below the reference point. In addition the present invention provides the feature of placing the scriber point at the horizontal level of the height gauge base and thereby have all scales and verniers read zero.

Similar characters of reference refer to like parts in the drawings, in which:

Figure 1 is a perspective view of the new and improved direct reading height gauge.

Figure 2 is a front elevational view of Figure 1 showing all scales and verniers reading zero.

Figure 3 is a rear elevational view of Figure 1.

Figure 4 is a view similar to Figure 2 showing the scriber arm locked in position at a given reference point.

Figure 5 is a view similar to Figure 2 showing both scales A and B in alignment at the given reference point.

Figure 6 is a view similar to Figure 2 showing the scriber arm in a selected dimensional position above the reference point.

Figure 7 is a view similar to Figure 3 showing the scriber arm in a selected dimensional position below the reference point.

Figure 8:
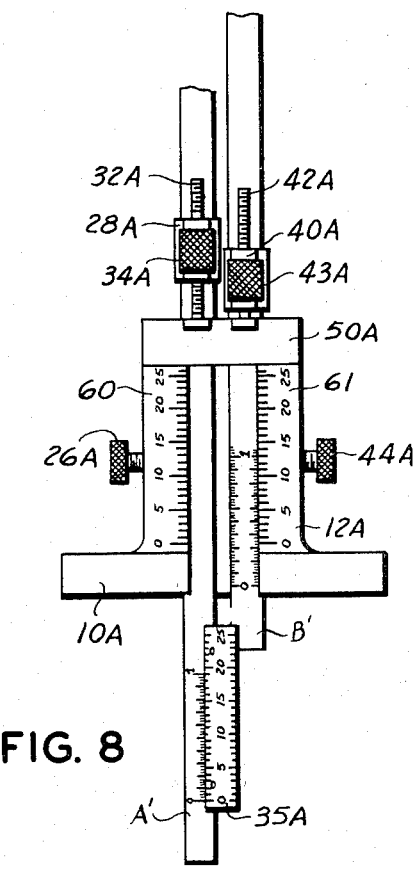
Figure 8 illustrates a vernier depth gauge provided with the two parallel cooperating scales A' and B'.

The height gauge shown in the drawings comprises a base 10 which supports a vertical standard 12 of generally rectangular cross section and with two vertical parallel grooves 11 and 13 in its front face. Grooves 11 and 13 are shown as being smooth sided but it is contemplated that they may be fabricated with dove-tail grooves. A rule 14 having a scale A is slidably mounted in groove 11. A rule 15 having a scale B is slidably mounted in groove 13.

Each scale A and B has a single zero point on its lower end with the scale running numerically upward in parallel relation with the adjacent scale (see Figure 2). Scales A and B are conventionally graduated between the major unit graduations shown in the drawing, with fine graduations for cooperation with the verniers described below. The fine graduations have not been shown in the drawings except for a few which are represented in Fig. 4. Scales A and B have equal scale intervals and the same direction of progression, so that when the zero points of each are aligned, the corresponding graduations of each will be aligned. The system of units employed may be English, metric, or the like.

A saddle 20 provided with a projecting arm 22 having a scribe or pointer 24 is slidably mounted upon standard 12. A thumb screw 26 at the side of the saddle opposite the pointer 24 is operative to lock saddle 20 in adjusted position upon standard 12. Saddle 20 is provided with a window or opening so that scales A and B can be readily seen. Saddle 20 is fixed to scale A.

Saddle 20 may be provided with a fine-adjustment mechanism which comprises a collar 28 slidably mounted upon standard 12. A thumb screw 30 rotatably mounted in collar 28 locks and unlocks collar 28 in adjusted position upon standard 12. The collar 28 is connected to the saddle 20 by a screw 32 having manually adjustable nut 34. With collar 28 locked in position and thumb screw 26 in unlocked position, adjustment of nut 34 will give a fine adjustment for the selected position of saddle 20.

Saddle 20 carries scale-reading indicia for scale B. Preferably and as shown, this is a vernier. The vernier 35 is positioned in co-operative relationship with scale B and is secured to saddle 20. The vernier 36 is positioned in co-operative relationship with scale A and is fixed to rule 15 and scale B.

Rule 15 may be provided with a fine-adjustment mechanism. A retaining bar 50 is secured to vertical standard 12 in a manner to permit rules 14, 15 to freely slide in grooves 11, 13 respectively. A collar 40 slidably mounted upon rule 15 is provided with a thumb screw 41 to lock rule 15 in adjusted position in relation to collar 40. Collar 40 is connected to retaining bar 50 by a screw 42 having a manually adjustable nut 43. A thumb screw 44 locks rule 15 in fine adjustment position in groove 13. With collar 40 locked in position to rule 15 through thumb screw 41, adjustment of nut 43 (with thumb screw 44 loose) will give a fine adjustment of the position of rule 15 along groove 13.

The preferred and advantageous method of use of the improved height gauge is as follows: The gauge is supported on a flat base-plate surface 45. The saddle 20 is slidably adjustable vertically to bring pointer or scribe 24 to rest upon the flat base-plate 45 (see Figure 2). The verniers 35, 36 on saddle 20 and rule 15 respectively, are opposite the zero marks on scales B and A respectively.

Let it be assumed that a two (2) inch square block is to be measured with the selected reference point or level at the horizontal center line of the block. Saddle 20 is raised until the zero on vernier 35 is opposite the one inch reading indicia on scale B. The base of scribe or pointer 24 is now in position whereby a reference mark can be made on the block. Figure 4 shows generally the relation of scale A to scale B but a reading of five inches plus is illustrated instead of one inch as in the example given. Rule 15, scale B is now raised until the zero mark on vernier 36 is opposite and parallel to the zero marks on vernier 35. Figure 5 generally illustrates the relation of scale A to scale B.

Let it be further assumed that a second reference point is desired one half inch above the first mentioned reference point. Loosen thumb screw 26, raise saddle 20 until vernier 35 is opposite the proper reading indicia on scale B. Figure 6 generally illustrates this relation of scale A to scale B under this condition.

If it is desired to have a third reference point located one half inch below the first mentioned reference point, loosen thumb screw 26 and lower saddle 20 until vernier 36 is opposite scale A. Figure 7 generally illustrates this condition and relation of scale A to scale B.

Figure 8 illustrates a vernier depth gauge provided with two parallel cooperating scales A' and B'. The interplay of scale A' to scale B' is the same as described for the height gauge. The vernier depth gauge comprises a base 10A, a vertical standard 12A provided with two parallel grooves, integrally formed with said base, two rules A', B' slidably mounted in said two parallel grooves, and vernier reading indicia 35A fixed to scale A' for comparative reading with scale B'.

Vertical standard 12A is provided with two parallel scales 60, 61 of equal graduations located adjacent the two parallel grooves for comparative reading of scales A' and B' respectively. A retaining bar 50A is secured to vertical standard 12A. A first collar 28A is slidably mounted upon scale A'. A thumb screw is rotatively mounted in the rear surface of collar 28A to lock and unlock collar 28A to scale A'. A second thumb screw 26A is rotatively mounted in vertical standard 12A to lock and unlock scale A' in its vertical groove. Another screw 32A provided with a manually adjustable nut 34A connecting collar 28A to retaining bar 50A for relative movement of collar 28A with retaining bar 50A. A second collar 40A is slidably mounted upon scale B'. A thumb screw is rotatively mounted in the rear surface of collar 40A to lock and unlock collar 40A to scale B'. A second thumb screw 44A is rotatively mounted in vertical standard 12A to lock and unlock scale B' in its vertical groove. Another screw 42A is provided with a manually adjustable nut 43A connecting collar 40A with retaining bar 50A for relative movement of collar 40A with retaining bar 50A. Scale A' and B' function as previously described for scales A and B.

Figure 9:
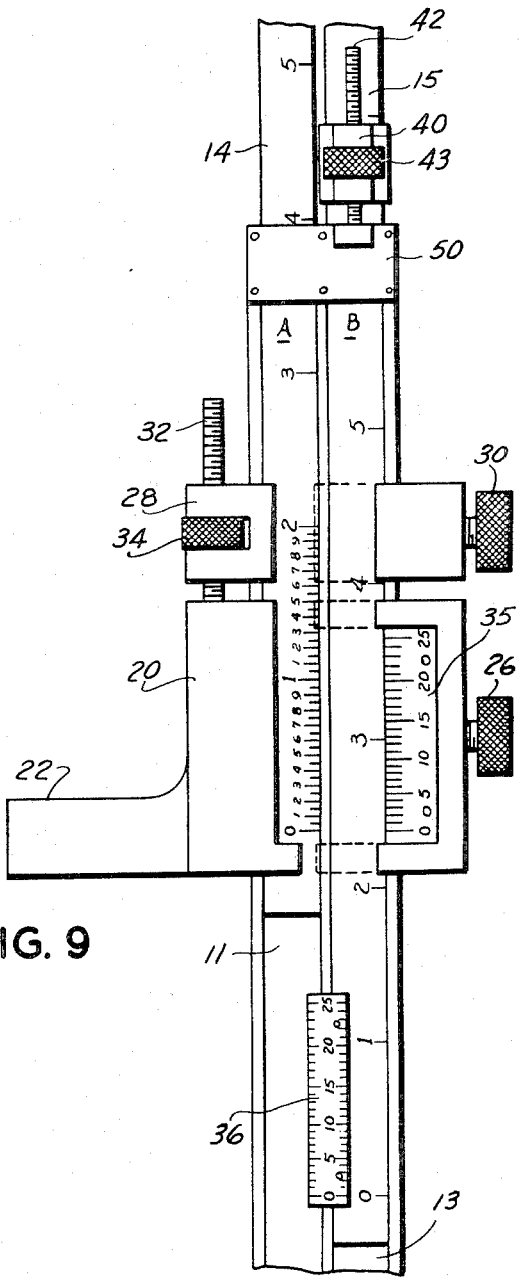
Figure 9 illustrates a fragmentary enlarged front elevational view of Figure 1.

Figure 9 illustrates enlarged graduations on scale A for more effective use of vernier calibrations.

Having shown and described a preferred embodiment of the present invention, by way of example, it should be realized that structural changes could be made and other examples given without departing from either the spirit or scope of this invention.

What I claim is:

1. A direct-reading height gauge, comprising a base, a vertical standard, provided with two parallel vertical grooves, fixed to said base, two rules, each one slidably mounted in each of said two parallel vertical grooves, a graduated scale carried by each rule with the graduations of one scale of equal spacing with, and aligned with the corresponding graduations on the adjacent scale in the starting position of each scale, a scribe-supporting saddle fixed to a first one of said scales and slidably mounted upon said vertical standard, means to lock and unlock said saddle to said vertical standard, reading indicia secured to said saddle for comparative reading with the second scale, and further reading indicia secured to said second scale for comparative reading with said first scale, said saddle being vertically movable with respect to said second scale to carry said first named indicia in scale-reading relation both upward and downward along said second scale from the zero point of said second scale and a second means to lock and unlock said second scale in adjusted position in relation to said first scale.

2. A direct-reading height gauge, comprising a base, a vertical standard, secured to said base and having two parallel vertical grooves, a first rule and a second rule, each one slidably mounted in each of said two parallel vertical grooves, for longitudinal adjustment with respect to the base, a first and a second graduated scale each having a zero point carried by said first and second rules, respectively, with the graduations of one scale equal and aligned with the graduations on the adjacent scale when both scales are in zero position, said scales running upward from the zero point, a scribe-supporting saddle slidably mounted upon said vertical standard and provided with an opening to permit reading of both scales, said saddle being secured to one of said scales and provided with reading indicia cooperatively related to the other scale, means to secure said saddle to said vertical standard at a selected reference height, means to secure the other of said rules having a scale to said vertical standard in calibrated position with its zero point aligned with said saddle indicia and thereby fixedly relate the zero point on the second scale to the reference height of said first scale, said saddle being subsequently movable both upard and downward along the second scale from the zero point to give direct-reading measurements of distances from said reference height.

3. A direct-reading height gauge, comprising a base, a vertical standard secured to said base, two vertical parallel grooves in one face of said vertical standard, a first rule provided with scale graduations slidably mounted in one of said two vertical parallel grooves, a second rule provided with similar scale graduations slidably mounted in the other of said two vertical parallel grooves each scale graduation having starting zero points which are in initial horizontal parallel alignment, a scribe supporting saddle slidably mounted upon said vertical standard and having an opening to permit reading of both scales, said saddle being secured to said first rule, a first vernier, secured to said saddle, cooperatively related to said second scale, a second vernier secured to said second rule cooperatively related to said first scale, a thumb screw in said saddle to lock and unlock said saddle to said vertical standard, a collar slidably mounted upon said vertical standard adjacent said saddle, a thumb screw to lock and unlock said collar to said vertical standard, a screw provided with a manually adjustable nut connecting said collar to said vertical standard for movement of said saddle relative to said collar when said collar is locked to said standard and said saddle thumb screw is in unlocked position, a retaining bar secured to said vertical standard, a second collar slidably mounted upon the second rule, a thumb screw rotatively mounted in said collar to lock and unlock said collar to said vertical standard, a second screw provided with a manually adjustable nut connecting said second collar to said retaining bar for movement of said collar relative to said retaining bar, a second thumb screw rotatively mounted in said vertical standard to lock and unlock said second rule to said vertical standard, said first and second mentioned manually adjustable nuts actuating said verniers on said saddle and said second scale, respectively, said saddle through said scribe supported thereon locating a selected reference point on said second scale, said second scale being adjusted to zero position in relation to said first scale, said saddle then movable above or below said zero position on said second scale to directly measure above or below said reference point.

4. A direct-reading vernier depth gauge comprising a base, a vertical standard provided with two parallel vertical grooves, integrally formed with said base, two rules, each one slidably mounted in each of said two parallel vertical grooves, a graduated scale carried by each rule with the graduations of one scale of equal spacing with, and aligned with the corresponding graduations on the adjacent scale in the starting position of each scale, vernier reading indicia fixed to one scale for comparative reading with the other scale, said vertical standard having two parallel scales of equal graduations located adjacent the two parallel grooves for comparative reading of one of said last mentioned scales with one of said first mentioned scales, a retaining bar secured to said vertical standard, a first collar slidably mounted upon the first rule, a thumb screw rotatively mounted in said collar to lock and unlock said collar to said vertical standard, a second screw provided with a manually adjustable nut connecting said second collar to said retaining bar for movement of said collar relative to said retaining bar, a second thumb screw rotatively mounted in said vertical standard to lock and unlock said first rule to said vertical standard, a second collar slidably mounted upon the second rule, a thumb screw rotatively mounted in said second collar to lock and unlock said second collar to said vertical standard, a third screw provided with a manually adjustable nut connecting said second collar to said retaining bar for movement of said second collar relative to said retaining bar, a third thumb screw rotatively mounted in said vertical standard to lock and unlock said second rule to said vertical standard, said first and second manually adjustable nuts actuating said first and second rules in fine adjustment.

References Cited in the file of this patent
UNITED STATES PATENTS

| | | |
|---|---|---|
| 2,325,558 | Uslan | July 27, 1943 |
| 2,412,870 | Champlin | Dec. 17, 1946 |
| 2,774,146 | McCoy | Dec. 18, 1956 |